United States Patent [19]

Chiao et al.

[11] 4,401,793

[45] Aug. 30, 1983

[54] POLYMERIC ADDUCTS WITH PENDANT POLYMERIZABLE DOUBLE BONDS, THEIR PREPARATION AND USE AS REACTIVE THICKENERS IN IMPROVED ANAEROBIC COMPOSITIONS

[75] Inventors: Wen B. Chiao, Piscataway; Dilip K. Ray-Chaudhuri, Bridgewater, both of N.J.

[73] Assignee: National Starch And Chemical Corporation, Bridgewater, N.J.

[21] Appl. No.: 299,390

[22] Filed: Sep. 4, 1981

[51] Int. Cl.³ .............................................. C08F 267/04
[52] U.S. Cl. ................................... 525/285; 525/260; 525/262; 525/263
[58] Field of Search ............... 525/289, 285, 262, 263, 525/260

[56] References Cited

U.S. PATENT DOCUMENTS 4,104,241 8/1978 Roberts et al. ..................... 525/285

*Primary Examiner*—J. Ziegler
*Attorney, Agent, or Firm*—Edwin M. Szala; Margaret B. Kelley

[57] ABSTRACT

Novel stable anaerobic compositions are prepared which contain, as a novel reactive thickener, a polymerizable polymeric adduct having pendant double bonds which is dissolved in a polymerizable monomeric diluent. The anaerobic compositions show improved performance properties. The thickener is prepared by reacting an anhydride-containing polymer with an excess of a $C_2$–$C_5$ hydroxyalkyl acrylate or methacrylate (e.g. hydroxyethyl and hydroxypropyl methacrylate), optionally in the presence of (meth)acrylate monomers which are not reactive with the anhydride groups of the polymer and which act as an additional diluent. The polymer may be prepared by conventional free radical polymerization techniques using maleic, citraconic, and/or itaconic anhydride and an ethylenically unsaturated monomer (e.g. $C_1$–$C_{10}$ alkyl acrylates or methacrylates or styrene).

13 Claims, No Drawings

POLYMERIC ADDUCTS WITH PENDANT POLYMERIZABLE DOUBLE BONDS, THEIR PREPARATION AND USE AS REACTIVE THICKENERS IN IMPROVED ANAEROBIC COMPOSITIONS

BACKGROUND OF THE INVENTION

This invention relates to novel anaerobic curing compositions containing conventional polymerizable (meth-)acrylate monomers, a free radical initiator, and a novel reactive thickener. It also relates to a process for preparing the thickener. It further relates to the use of the improved anaerobic compositions as adhesives and sealants.

Anaerobic compositions are well-known in the art. They are so formulated or treated that the compositions remains in an uncured state over long periods of time provided that the compositions are exposed to an adequate supply of air or oxygen throughout that period, but which polymerize spontaneously upon the exclusion of air or oxygen therefrom, as when placed between non-porous surfaces (e.g. metal or glass). Depending upon the exact formulation, such compositions may be used as adhesives or sealants.

It is known to incorporate as thickeners in anaerobic compositions inorganic compounds such as Cabosil (trade name for a fumed silica supplied by the Cabot Corp.), tackifiers such as rosins, rosin derivatives and terpenes, polymeric thickeners such as methacrylate and styrene-methacrylate polymers, and synthetic rubbers such as butadiene-styrene and butadiene-acrylonitrile. These thickeners do little to improve the final properties of the cured compositions since they do not take part in the final cure but remain as a separate component in the cured adhesive or sealant.

The object of this invention is to prepare novel and improved anaerobic compositions, useful as adhesives and sealants, which have incorporated therein, as a novel reactive thickener, a polymerizable polymeric adduct having pendant double bonds which is dissolved in a polymerizable monomeric diluent. It is a further object to prepare the thickener by reacting a polymer containing reactive anhydride groups with an excess of a hydroxy-containing (meth)acrylate monomer.

SUMMARY OF THE INVENTION

Novel stable anaerobic compositions are prepared which contain, as the novel reactive thickener, a polymerizable polymeric adduct having pendant double bonds dissolved in a polymerizable monomeric diluent. The compositions are formulated by conventional methods using the typical acrylate or methacrylate monomers or mixtures thereof, a free radical initiator, and preferably, but not necessarily, a stabilizer, an accelerator, a chelator, and/or minor amounts of acidic monomers, such as acrylic acid, methacrylic acid, and/or citraconic, itaconic, and maleic acid or their anhydrides. They are useful as adhesives and sealants which, on curing, show improved performance properties. The properties of the cured composition depend on the glass transition temperature ($T_g$) of the backbone and the grafting polymer. For example, cured adhesives having a low $T_g$ ($<0°$ C.) on the polymer backbone (e.g. ethyl acrylate copolymers) and high $t_g$ ($<50°$ C.) on the grafting polymer show improved impact and tensile shear strengths. Cured adhesives having a high $T_g$ on both the backbone (e.g. styrene copolymers) and grafting polymers show improved torque. The $T_g$ of the polymer backbone can be conveniently modified by properly selecting the monomers used in the preparation of the polymer used for preparing the adduct.

The novel reactive thickener is prepared by reacting an anhydride-containing polymer with an excess of a $C_2$–$C_5$ hydroxyalkyl acrylate or methacrylate monomer, optionally in the presence of (meth)acrylate monomers which are not reactive with the polymer's anhydride group. The excess hydroxy-containing monomer and the non-reactive (meth)-acrylate monomer, if any, act as the polymerizable monomeric diluent. The anhydride-containing polymer used in the preparation of the adduct should be substantially free of unreacted monomer. It may be prepared by conventional free radical polymerization techniques, such as solution polymerization, using maleic, citraconic, and/or itaconic anhydride and at least one ethylenically unsaturated monomer such as ethyl, butyl, or octyl (meth)acrylate or styrene.

DESCRIPTION OF THE PREFERRED EMBODIMENTS

Preparation of The Novel Reactive Thickener

The anhydride-containing polymers useful in preparing the reactive thickener are themselves prepared by free radical polymerization using known polymerization techniques, such as bulk, emulsion, suspension, or preferably solution polymerization. From about 0.5–50 mole %, preferably about 1.5–25 mole %, of an anhydride monomer selected from the group consisting of maleic anhydride, citraconic anhydride, itaconic anhydride, and mixtures thereof is reacted with about 50–99.5 mole %, preferably about 75–98.5 mole %, of at least one ethylenically unsaturated monomer having the formula $CH_2=C(R^1)X$, where $R^1$ is H, $CH_3$, or CN; X is a phenyl or COOR group with R being a $C_1$–$C_{10}$ alkyl group, optionally substituted with a halogen, or a $C_7$–$C_{20}$ aralkyl group optionally substituted with halogen or an alkoxy or ester group.

Typical ethylenically unsaturated monomers suitable for reaction with the anhydrides include, for example, ethyl acrylate, butyl acrylate, octyl acrylate, methyl methacrylate, ethyl methacrylate, styrene, α-methyl styrene, and the like. Mixtures of ethylenically unsaturated monomers may also be used. A typical polymerization is carried out at 50° to 100° C., in a nitrogen atmosphere using a free radical initiator, such as 2,2'-azobis(isobutyronitrile) and a solvent such as ethyl acetate. If substantial amounts of excess monomer are present, they are preferably removed, as by stripping, prior to the subsequent reaction to form the polymeric adduct. Typically such stripping will remove any solvent present, and additional solvent, if desired, may be added prior to or during the reaction to form the adduct.

The anhydride-containing polymer is then reacted with at least one hydroxy-containing acrylate or methacrylate monomer such as a $C_2$–$C_5$ hydroxyalkyl acrylate or methacrylate, preferably hydroxyethyl acrylate, hydroxypropyl acrylate, hydroxyethyl methacrylate, hydroxypropyl methacrylate, and mixtures thereof. The monomer reacts with the polymer by adding to the anhydride through the monomer's hydroxyl group and thus forms a polymerizable polymeric adduct having pendant double bonds. The hydroxy-containing monomer is used in an excess of the molar amount required, based on the number of moles of anhydride in the polymer. Typically from about 2 to 50 moles of hydroxy-containing monomer are used. The excess monomer acts as polymerizable monomeric diluent. In order to reduce the viscosity of the thickener, it may be desirable in some cases to carry out this addition reaction in the presence of a polymerizable monomeric diluent which is not reactive with the anhydride groups of the polymer. If the thickener is to be used in an anaerobic composition, any of the monomers typically used in such compositions except those containing groups reactive with anhydride groups (i.e. hydroxy groups) may be used as the optional diluent. For anaerobic compositions these include the monomers in the five classes to be described hereinafter, preferably those from the 1st class (e.g. tetraethylene-glycol dimethacrylate) and those from the 5th class.

The resulting reactive thickener contains about 5 to 95% by weight of the adduct, based on the total weight of the thickener. Preferably it contains about 50 to 75% of the adduct. If stored prior to incorporation in the anaerobic composition or prior to use as a coating composition, it should be stored in the presence of oxygen or air. In order to improve the storage stability of the thickener it is preferable, but not necessary, that the composition contain a stabilizer such as an inhibitor for free radical polymerization. Such inhibitors will be described hereafter.

The adduct is characterized by recurring units having one or more of the formulas:

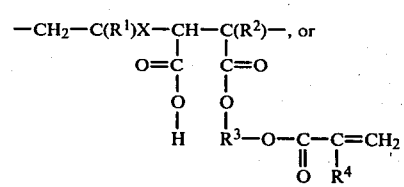

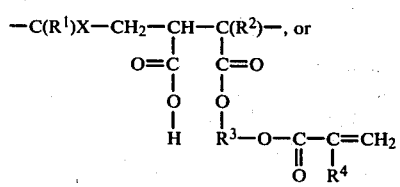

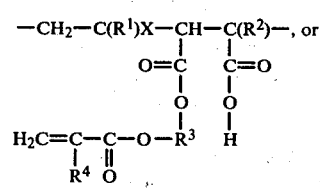

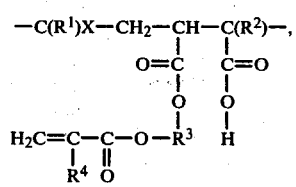

when maleic and/or citraconic anhydride are used in the polymer preparation, or having one or more of the formulas:

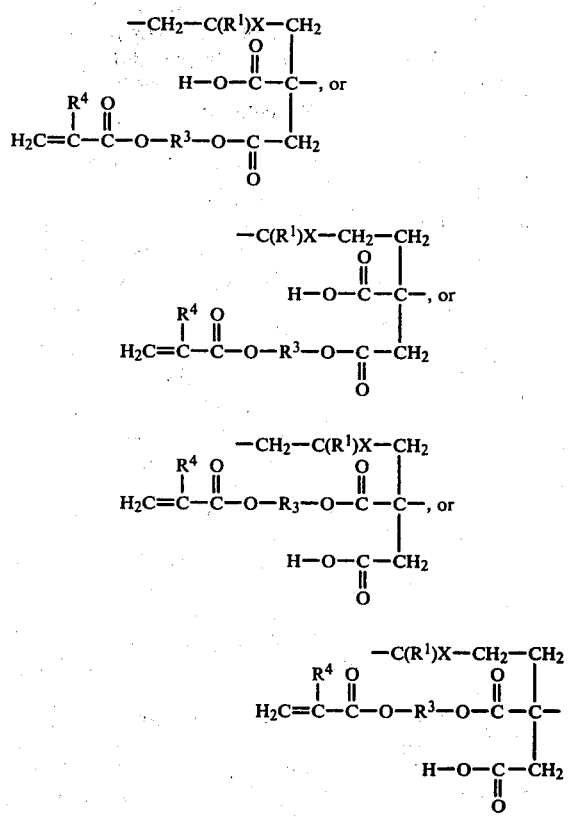

when itaconic anhydride is used in the polymer preparation. $R^1$ and X are as defined above; $R^2$ and $R^4$ are independently H or $CH_3$; and $R^3$ is a $C_2$-$C_5$ alkyl group.

Preparation of The Anaerobic Composition

The monomers employed herein are anaerobically curable monomers having at least one polymerizable acrylate ester group.

The 1st class of monomers useful herein correspond to the general formula:

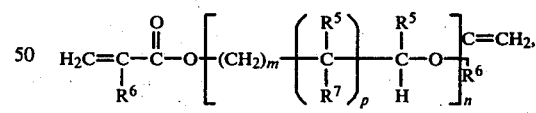

where $R^5$ is H, $CH_3$, $C_2H_5$, $CH_2OH$, or $CH_2$—O—C(-=O)—C($R^6$)=$CH_2$; $R^6$ is H, Cl, $CH_3$ or $C_2H_5$; $R^7$ is H, OH, or O—C(=O)—C($R^6$)=$CH_2$; m is 1-8, preferably 1-4; n is 1-20; and p is 0-1.

Monomers typical of this class include, for example, ethyleneglycol dimethylacrylate, ethyleneglycol diacrylate, polyethyleneglycol diacrylate, tetraethyleneglycol dimethyacrylate, diglycerol diacrylate, diethyleneglycol dimethacrylate, pentaerythritol triacrylate, and other polyester diacrylates and dimethcacrylates. The above class of monomers is described in U.S. Pat. No. 3,043,820 issued July 10, 1962 to R. H. Krieble.

The 2nd class of monomers useful herein correspond to the general formula:

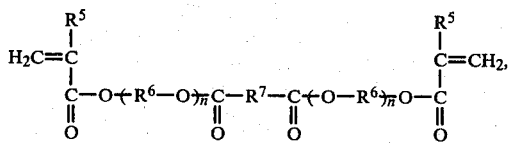

where
R$^5$ is H, Cl, CH$_3$, or C$_2$H$_5$;
R$^6$ is a C$_2$–C$_6$ alkylene;
R$^7$ is (CH$_2$)$_m$,

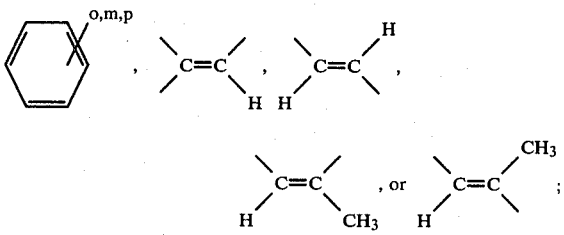

n is 1–4; and m is 0–8.

Monomers typical of this class include, for example, dimethylacrylate of bis(ethyleneglycol) adipate, dimethylacrylate of bis(ethyleneglycol) maleate, dimethacrylate of bis(diethyleneglycol) phthalate, dimethacrylate of bis(tetraethyleneglycol) phthalate, dimethylacrylate of bis(tetraethyleneglycol) malonate, dimethacrylate of bis(tetraethyleneglycol) sebacate, dimethacrylate of bis(ethyleneglycol) phthalate, dimethacrylate of bis(tetraethyleneglycol) maleate, and the diacrylates and α-chloro-acrylates corresponding to said dimethacrylates, and the like. The above class of monomers is described in U.S. Pat. No. 3,457,212 issued July 22, 1969 to Y. Fukuoka et al.

The 3rd class of monomers useful herein are isocyanae-hydroxyacrylate or isocyanate-aminoacrylate reaction products which may be characterized as acrylate terminated polyurethanes and polyureides or polyureas. These monomers correspond to the general formula:

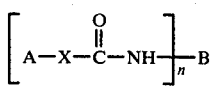

where X is O or N(R$^5$); R$^5$ is H or a C$_1$–C$_7$ alkyl; A represents the organic residue of an active-hydrogen-containing acrylate ester wherein the active hydrogen has been removed, the ester being hydroxy- or amino-substituted on the alkyl portion thereof and the methyl, ethyl, and chlorine homologs thereof; B is a mono- or polyvalent organic radical selected from the group consisting of alkyl, alkylene, alkenyl, alkenylene, cycloalkyl, cycloalkylene, aryl, arylene, aralkyl, aralkylene, alkaryl, alkarylene, poly(oxyalkylene), poly(carboalkoxyalkylene), and heterocyclic radicals both substituted and unsubstituted; and n is 1–6.

Monomers typical of this class include for example, the reaction product of a mono- or polyisocyanate, (e.g., toluene diisocyanate or methylene bis-phenyl diisocyanate) with an acrylate ester containing a hydroxyl or amine group in the non-acrylate portion thereof, (e.g. hydroxyethyl methacrylate). The above class of monomers is described in U.S. Pat. No. 3,425,988 issued Feb. 4, 1969 to J. W. Gorman et al.

The 4th class of monomers useful herein correspond to the acrylate diesters of bis-phenol-type compounds. These monomers correspond to the general formula:

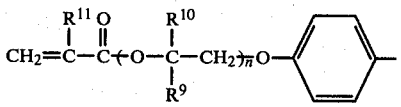

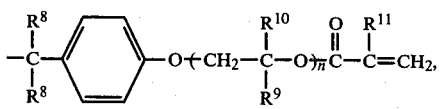

where
R$^8$ is CH$_3$, C$_2$H$_5$, COOH, or H;
R$^9$ is H, CH$_3$, or C$_2$H$_5$,
R$^{10}$ is H, CH$_3$, or OH;
R$^{11}$ is H, Cl, CH$_3$, or C$_2$H$_5$; and
n is 0–8.

Monomers typical of this class include, for example, dimethacrylate and diacrylate esters of 4,4'-bishydroxyethoxy-bisphenol A; dimethacrylate and diacrylate esters of bisphenol A; etc. These monomers are described in Japanese Pat. Publication 70-15,640 of K. Orite, M. Natsume, and N. Shimada in 1970.

The 5th class of monomers consists of monofunctional acrylate and methacrylate esters and the hydroxy-, amido-, cyano-, chloro-, and silane-substituted derivates thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decyl methacrylate, dodecyl methacrylate, cyclohexyl methacrylate, t-butyl methacrylate, acrylamide, N-methylolacrylamide, diactone acrylamide, N-t-butyl acrylamide, N-t-octyl acrylamide, N-butyoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

The monomers useful herein are seen to be anaerobically curable monomers having one or more polymerizable acrylate or substituted acrylate ester groups as a common, unifying characteristic. The preferred monomers are those in the 1st and 5th classes above described.

In the production of anaerobic curing adhesive compositions characterized by exceptionally high bond strength in the resultant cured polymer, the particular monomer employed may be chosen so as to contain an alcoholic, carboxylic, or other relatively polar group substituted thereof. Examples of such polar groups in addition to the hydroxyl and carboxyl groups include amino, amido, cyano, mercapto, and halogen polar groups. Monomers containing hydroxyl groups and/or labile hydrogen atoms are preferred. Examples of suitable monomers include hydroxyethyl (meth)acrylate, hydroxypropyl (meth)acrylate, diacetone acrylamide, 2-cyanoethyl acrylate, 2-chloroethyl acrylate, 2-hydroxy-3-chloropropyl methacrylate, (meth)acrylic acid, itaconic acid, citraconic acid, maleic acid, and the like. The hydroxy-containing monomers are used in amounts from about 5–95%, preferably 25–50%, and the carboxyl-containing monomers in amounts from about 0.1–15%, preferably 0.5–10%, both by weight based on the total composition weight.

For best results in terms of adhesive activity, the monomers are preferably employed in a purified state. However, the monomers may be comprised of commercial grades in which inhibitors, stabilizers, other additives or impurities may be present, provided that the activity and/or stability of the adhesive is not reduced to unacceptable levels.

In the preparation of the anaerobic curing compositions herein, it is possible to employ a mixture of acrylate ester monomers. There may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include vinyl acetate, methyl vinyl ether, methyl vinyl ketone, poly(ethylene maleate), allyl alcohol, allyl acetate, 1-octene, styrene, etc. Preferably, the total optional non-acrylic monomer(s) will constitute no more than 50% by weight of the monomeric composition, and most preferably no more than 30%.

The anaerobic compositions herein are prepared using conventional techniques. Useful free radical initiators include hydrogen peroxide and peroxy compounds such as organic hydroperoxides (e.g. cumene, t-butyl, and methylethyl ketone hydroperoxides), peroxides (e.g. benzoyl, cyclohexyl, and hydroxycyclohexyl peroxides), and peresters (e.g. t-butyl perbenzoate and t-butyl peracetate; diazosulfones together with o-benzoic sulfimide (saccharin); α-amino sulfones (e.g. N-(o- or p-carboethoxyphenyl)-(p-tolylsulfonemethyl) amine); or azo compounds (e.g. 2,2'-azobis(isobutyronitrile).

Alternatively, an accelerator system consisting of a N-substituted sulfonamide (e.g. N-tosyl-p-toluene sulfonamide, N-mesyl-p-toluene sulfonamide, N-mesyl-benzene sulfonamide, N-mesyl-methane sulfonamide, or N-benzene sulfonamide) or of an organic cyclic sulfimide (e.g. o-benzoic sulfimide) together with an aromatic tertiary amine (e.g. N,N-dimethyl-p-toluidine, N,N-diethyl-p-toluidine, N,N-dimethylaniline, or 3,4-dimethyl-N,N-dimethylaniline) may be used with compositions containing at least 25 ppm of active oxygen (see U.S. Pat. No. 4,215,209 issued July 29, 1980 to D. K. Ray-Chaudhuri et al. and U.S. Pat. No. 4,235,986 issued Nov. 25, 1980 to W. J. Catena).

In order to improve the storage stability of the composition, it is preferable, but not necessary, that the composition contain a stabilizer such as an inhibitor of free radical polymerization. Suitable inhibitors include those conventionally employed, such as hydroquinones, benzoquinone, naphthoquinone, p-t-butyl catechol, phenothiazine, sterically hindered phenols, etc. The amount of inhibitor employed depends, for example, on the type of monomer used, as well as the free radical initiator used. Generally, it ranges from 0.0001 to 0.1% weight, based on monomer, preferably 0.0025 to 0.05%. While the monomer will normally be obtained with a certain amount of inhibitor present therein, additional inhibitor may be added as necessary at any time to bring the amount up to the required level. In the case where the monomer is subjected to elevated temperatures, the required amount of inhibitor should be present prior to heating of the mixture.

The presence of a chelating agent (chelator) is also preferable, but not necessary, and it provides the compositions herein with better stability. The chelator is defined, herein, as a compound capable of complexing with a metal atom through coordination bonds between the metal and the ligand atoms of the chelator to form a heterocyclic ring. Although many chelating agents are suitable, the preferred chelators are oxalic acid and those compounds having a combination of oxygen and nitrogen ligand atoms such as hydroxyquinoline and the α- and β-aminocarboxylates such as tetrasodium ethylenediamine tetracetic acid ($Na_4ETDA$). In general, the chelator useful herein should preferably be soluble in the monomer.

An example of a type of chelator which is not useful herein is the class where all ligand atoms are nitrogen, for example, dipyridyl (see U.S. Pat. No. 4,038,475 issued July 26, 1977 to E. Freunglass et al).

The amount of chelator employed depends mainly on the type of chelator, but also to a minor extent on the amounts and types of other ingredients in the composition. Amounts from about 0.0001% to about 0.1% by weight of the total composition may be employed, depending upon the particular chelator added. It is noted that with certain chelators, the amount thereof must not exceed about 0.01% by weight to obtain an adhesive having good properties. When these chelators are added in amounts above this limit, the bond strength of the adhesive decreases dramatically. The practitioner will readily discover which chelators may be added in which amounts to best advantage. The lower limit of chelator is determined by the minimum stability desired in the composition. Preferred amounts of chelator range from 0.001 to 0.02% by weight.

Since the initiator, inhibitor, and chelator employed herein are generally very soluble in the acrylate- and methacrylate-based monomers, it is usually unnecessary to employ a solvent or diluent in order to produce a satisfactory anaerobic composition. If, however, the presence of a solvent is desired, then any solvent or diluent which dissolves the initiator, inhibitor, and chelator, as well as any accelerators which may be present and are soluble in the monomer, may be employed. Common solvents are described in the literature and include, for example, alkanols such as methanol, ethanol and butanol, ketones, substituted and unsubstituted formamides such as formamide and N,N-dimethyl formamide, and polyester diluents.

One additive which may be employed for purposes of increasing the stability of compositions containing the accelerator system based on sulfonamide and an aromatic tertiary amine is an aliphatic tertiary amine, such as trialkylamine wherein each alkyl group contains 1-4 carbon atoms and may have hydroxyl substitution. Suitable such amines are, for example, trimethylamine, triethylamine, diethylpropylamine, tripropylamine, tri-iso-propylamine, tri-n-butylamine, tri-iso-butylamine, tri-t-butylamine, triethanolamine, ethyldimethylamine, and 2-diethylaminoethanol. Such aliphatic amines, if added, must be present in amounts not exceeding the molar concentration of the sulfonamide in the monomeric composition. If a stoichiometric excess of these amines is present, a suitable adhesive composition will not be obtained. It is to be understood that these aliphatic amines cannot be used as substitutes for the aromatic teritiary amines required herein, as the former alone will not provide the needed activity for the adhesive. They are therefore employed only in conjunction with the aromatic amines.

In the production of the novel anaerobic curing compositions herein it may also be desirable to employ conventional antioxidants to prolong the shelf life of the composition further. In particular, it may be preferred to add a sterically hindered phenol, e.g. butylated hydroxytoluene (BHT), butylated hydroxyanisole (BHA), or such antioxidants as are commercially available under the registered trademarks IONOX 220 (Shell), SANTONOX R (Monsanto), IRGANOX 1010, and IRGANOX 1076 (Ciba-Geigy).

The compositions of this invention may also incorporate, as auxiliary accelerators of polymerization, organic acids, preferably organic monocarboxylic acids such as benzoic acid, paratoluic acid or naphthyl acetic acid, or their corresponding anhydrides. Anhydrides of dibasic aromatic acids, such as phthalic or terephthalic acid, may also be used. Aliphatic acids, are, in general, less satisfactory as accelerators for the compositions herein when the compositions are employed on many non-ferrous metal surfaces. However, these acids have some utility when the compositions are employed on ferrous metals and may conveniently be employed in conjunction with aromatic acids for bonding non-ferrous surfaces.

There may also be present in the compositions plasticizers such as, for example, dibutyl or dioctyl phthalates, triethylene glycol, or polyethylene glycol dilaurate. Tackifying resins, such as styrene/alphamethylstyrene copolymer (trademark Kristalex of Hercules), and inorganic thickeners are not usually needed, but may be included if desired. Other optional ingredients include adhesive agents, and cut-glass fibers, as well as visible dyes or ultraviolet dyes and/or fluorescent agents. The dyes serve to increase the visibility of the normally colorless or very pale compositions so that treated surfaces can be readily distinguished from untreated surfaces. Typical dyes include those of the anthraquinone series such as 1,4-diamonomethylaminoanthraquinone. Dyestuffs containing unsubstituted hydroxyl groups or unsubstituted amino groups are in general to be avoided, since they exert a marked inhibiting influence on the polymerization of the compositions.

Depending on the particular ingredients and the temperature and time allowed for heating and/or stirring, the composition herein may be stored at room temperature for periods of months and in some cases even years prior to actual use without any evidence of gelling. It is only necessary that there by present a moderate amount of air or oxygen which is provided conveniently by a small volume of air in a properly shaped container, preferably made of polyethylene or a similar material which is permeable to air. However, upon exclusion from air by placement between adjacent surfaces, the composition will rapidly polymerize to form a strong bond, which polymerization can be further accelerated by use of elevated temperatures, although use of elevated temperatures is not necessary since these compositions produce strong bonds within a matter of minutes.

The anaerobic polymerization of the compositions herein is accelerated by the surface of certain metals including iron, mild steel, cadmium, cobalt and manganese. Certain other metals, including aluminum and zinc have a lower catalytic activity. Non-metallic surfaces such as glass do not catalyze polymerization. In the bonding of surfaces of low catalytic activity, it may be advantageous to use a primer such as an aldehyde-amine condensate (e.g., those primers represented in U.S. Pat. No. 3,616,040 issued Oct. 26, 1971 to A. S. Toback) or a derivative of a catalyst metal such as ferric chloride, cobalt naphthanate or manganese resinate.

The reactive thickener may be added at any time during the formulation of the anaerobic composition. Preferably it is added initially together with the (meth)acrylate monomers. It is used in amounts from about 5-95% by weight, based on the total composition weight. The preferred amount is 40-80%.

The following test procedures were employed in the examples below:

Determination of Active Oxygen Content

About 0.1 to 0.5 g. of the sample is weighed in a small glass flask to which is added about 10 ml. glacial acetic acid. A pellet of dry ice about the size of a large pea is placed in the solution to dispel air. When about one-half of the dry ice has evaporated, 1 ml. of a saturated aqueous solution of potassium iodide is added and the flask swirled to dissolve the ingredients. A loosely fitting cork is placed in the flask to retain the inert atmosphere and the mixture is heated for about 15 minutes in a 60° C. oven. Immediately after removal of the flask from the oven, 10 ml. of water is added to prevent interference of air. The warm solution is promptly titrated with 0.1 N sodium thiosulfate until the color of the iodine just disappears. Starch indicator should not be added. The active oxygen content is obtained using the formula:

$$\frac{(\text{ml. of } 0.1N\ Na_2S_2O_3) \times (0.08 \times 10^4)}{\text{weight (g.) of sample}} = \text{ppm. of active oxygen}$$

Determination of Shelf Stability (Gel Time)

A 5 cc. sample of the composition is added to a test tube, which is then placed in a bath heated to 82° C. for a minimum of 30 minutes. As an approximate correlation between oven-aging and aging at room temperature, it is believed that a sample still free from gelling after more than 24 hours of aging will be stable at ambient temperatures in the presence of oxygen for at least about one year.

Determination of Break Torque and Average Prevailing Torque

The strength of the bond between threaded members is determined as follows: About two or three drops of each composition are placed on the exposed threads of separate ⅜×24 mild steel Class II fit bolts (degreased), and immediately thereafter a nut (degreased) with mating threads is run onto the bolt so that the nut is directly in the thread area of the applied composition. The sealant is allowed to set and cure at room temperature for a specified period of time, normally 0.5, 1 or 24 hours, and the strength of the bond formed between the nut and bolt is then measured. The break torque for the bond is the amount of torque required for a wrench to remove the nut on the threads initially. The average prevailing torque for the bond is the average amount of torque required for a wrench to turn a series of three bolts for ¼ turn ½ turn, ¾ turn and a full turn. Commercially, a bolt sealant developing an average torque of 12 inch-pounds after 24 hours of cure is considered satisfactory.

Determination of the Tensile Shear and Impact Strength

These strength properties in the adhesive were determined according to the ASTM Standard Method of Test Designation D 950-72 (1973) for the impact strength and D 1002-72 (1973) for the tensile shear strength.

The following examples serve to illustrate further the embodiments of the present invention. In the examples, all parts and percentages are given by weight and all temperatures in degrees Celsius unless otherwise noted.

EXAMPLE I

This example describes the preparation of a novel reactive thickener containing a polymerizable polymeric adduct of an ethyl acrylate/maleic anhydride copolymer and hydroxyethyl methacrylate dissolved in excess hydroxyethyl methacrylate.

A total of 200 parts ethyl acetate, 30 parts (0.3 mole) ethyl acrylate, 2.16 parts (0.022 mole) maleic anhydride, and 0.3 part 2,2'-azobis(isobutyronitrile) was charged to a 1 l. round bottom flask fitted with a stirrer, condenser, thermometer, nitrogen inlet adapter, and addition funnels. The mixture was heated under a nitrogen atmosphere with stirring to 75°–80° C. and held for 30 min. At the end of the holding period, polymerization had initiated as shown by an increase in the mixture's viscosity. A monomer mixture of 260 parts ethyl acrylate (2.6 moles) and 2.16 parts maleic anhydride (0.022 mole) and an initiator solution of 2.7 parts azoisobutylnitrile in 50 parts ethyl acetate were added separately and slowly to the initial charge over a 3 hr. period while maintaining the reaction temperature at 75°–80° C. After completing the addition, the mixture was held for 2 hr. The ethyl acetate was distilled off at atmospheric pressure. A vacuum was then applied to strip off any residual ethyl acetate and any unreacted monomers; the vacuum was maintained for 2 hr. at 110°–120° C., broken, and the temperature was lowered to 90°–100° C.

A total of 145 parts (1.12 moles) hydroxyethyl methacrylate and 0.03 part hydroquinone were then added to the resulting ethyl acrylate/maleic anhydride copolymer (98.5/1.5 mole %). The mixture was stirred and maintained at 90°–100° C. for a time sufficient to insure reaction of the anhydride groups in the copolymer with the hydroxyethyl methacrylate monomer. The IR absorption of the mixture (a reading of 1780 cm.$^{-1}$ corresponds to the anhydride group in the polymer) was monitored every 30 min. After the anhydride groups were completely reacted, the mixture was discharged to a 1 l. polyethylene bottle. The resulting reactive thickener (I-A) contained 67% of the polymerizable polymeric adduct and 33% hydroxyethyl methacrylate as diluent, the percentages being by weight. It had a RFV Brookfield viscosity of 305,000 cps. at 25° C.

EXAMPLE II

This example describes the composition of additional reactive thickeners prepared using the method of Example I with some variations in the amount of initiator used. The monomers used include methyl acrylate (MA), ethyl acrylate (EA), butyl acrylate (BA), octyl acrylate (OA), methyl methacrylate (MMA), styrene (ST), maleic anhydride (MAN), citraconic anhydride (CAN), hydroxyethyl methacrylate (HEMA), and hydroxypropyl methacrylate (HPMA). The molar composition of the polymer, the excess monomer used in the preparation of the adduct, and the solids content and viscosity of the reactive thickeners are given in Table I.

EXAMPLE III

This example describes the preparation of anaerobic adhesive formulations prepared using the reactive thickener of Example I and some of the reactive thickeners of Example II. The adhesives were evaluated using the testing procedures previously described. Both surfaces were primed with a sulfone primer.

TABLE I

| Polymeric Adduct Composition | | Reactive Thickener | | | |
| --- | --- | --- | --- | --- | --- |
| | Hydroxy-Containing Monomer (excess) | Designation | Adduct (wt. %) | Diluent** (wt. %) | Brookfield Viscosity (cps. at 25° C.) |
| Acrylic/Anhydride Polymer* | | | | | |
| (mole %) | | | | | |
| EA/MAN (97/3) | HEMA | II-A1 | 75 | 25 | 376,000 |
| EA/MAN (96/4) | HEMA | II-A2 | 67 | 33 | 376,000 |
| EA/MAN (95/5) | HEMA | II-A3 | 67 | 33 | 450,000 |
| EA/CAN (98.5/1.5) | HEMA | II-B | 67 | 33 | 87,500 |
| EMA/MAN (96.5/3.5) | HEMA | II-C | 50 | 50 | 136,000 |
| EA/MMA/MAN (91.5/5/3.5) | HEMA | II-D1 | 67 | 33 | 350,000 |
| EA/MMA/MAN (86.5/10/3.5) | HEMA | II-D2 | 67 | 33 | 425,000 |
| EA/BA/MAN (86.5/10/3.5) | HEMA | II-E1 | 67 | 33 | 960,000 |
| EA/BA/MAN (76.5/20/3.5) | HEMA | II-E2 | 60 | 40 | 1,296,000 |
| EA/BA/MAN (76.5/20/3.5) | HEMA | II-E3 | 70 | 30 | 480,000 |
| EA/BA/MAN (66.5/30/3.5) | HEMA | II-E4 | 60 | 40 | 234,000 |
| EA/BA/MAN (56.5/40/3.5) | HEMA | II-E5 | 51 | 49 | 132,000 |
| BA/ST/MAN (82/15/3) | HEMA | II-F | 75 | 25 | 51,000 |
| MMA/OA/MAN (37/60/3) | HPMA | II-G | 67 | 33 | 62,000 |
| ST/MAN (75/25) | HEMA | II-H | 63 | 37 | 24,000 |
| Acrylic Polymer | | | | | |
| (mole %) | | | | | |
| EA (100) | HEMA | Control | 75 | 25 | 400,000 |

*EA, BA and OA are abbreviations for ethyl, butyl, and octyl acrylate, respectively; EMA and MMA are abbreviations for ethyl and methylmethacrylate, respectively; and MAN and CAN are abbreviations for maleic and citraconic anhydride, respectively.
**Diluent was an excess of the hydroxy-containing monomer, i.e. hydroxyethyl methacrylate (HEMA) and hydroxypropyl methacrylate (HPMA), used in the polymer preparation except for the thickener designated II-H where the diluent was a mixture of 20% HEMA used in the polymer preparation and 17% tetraethylene glycol dimethacrylate (as the non-reactive monomeric diluent).

A total of 53.3 parts of the reactive thickener I-A (see Example I) was added to a 500 ml. high density polyethylene beaker, and 10 parts isobornyl methacrylate and 27.0 parts hydroxyethyl methacrylate were added with stirring. The temperature was raised to 75°–80° C. The mixture was maintained at this temperature for 2 hr., and then 0.0125 part oxalic acid, 0.005 parts of tetrasodium salt of ethylenediamine tetraamine (Na₄EDTA) dissolved in methanol-water (5% solution) were added. The temperature was lowered to 60°-65° C. and 2.5 parts N-mesyl-p-toluene sufonamide were added. The mixture was held for 1 hr., and 0.6 parts N,N-dimethyl toluidine were added slowly in increments of 0.2 part every 30 min. The mixture was held for 1 hr. after the addition was completed; then 6.0 parts methacrylic acid were added. The mixture was held for 45 min. and 0.005 part 2-methoxy-1,4-naphthoquinone was added. The mixture was held for 14 min. and 0.5 parts cumene hydroperoxide were added. The resulting anaerobic adhesive formulation was cooled to room temperature and discharged to a 500 ml. polyethylene bottle.

Similar formulations were prepared using the indicated reactive thickeners and methacrylate monomers. The procedure used was the same as above except that 60 p.p.m. oxalic acid were used. In addition, 1 part ethylene glycol dimethacrylate was used and no N,N-dimethyl toluidine was used. The formulations and their evaluation are summarized in Table II. The results show that the tensile shear strength and impact strength of the adhesives containing the reactive thickeners were much higher than the values for the control containing the non-reactive thickener, i.e. ethyl acrylate polymer (100%).

EXAMPLE IV

This example describes the preparation of additional anaerobic adhesive formulations using other reactive thickeners (see Example II for the preparation of the thickeners).

ture was cooled to room temperature. A total of 6.0 parts methacrylic acid (MA) and 0.005 part 2-methoxy-1,4-naphthoquinone were then added, and the mixture was stirred for 1 hr.

Formuation IV-B was prepared by charging 70.0 parts of the reactive thickener designated II-H, ST/MAN (75/25) and HEMA, 25.5 parts tetraethylene glycol dimethacylate, 0.01 part Na₄ EDTA, 0.005 part oxalic acid, and 1.5 part saccharin to a polyethylene crock fitted with a stirrer. The mixture was heated to 65°-70° C. over a 30 min. period and then held for 2 hr. with stirring. It was cooled to room temperature, 3.0 parts cumene hydroperoxide were added, and the mixture was maintained overnight at room temperature with stirring. The gel time at 82° C. was checked, and when the gel time was over 75 min., 0.3% (based on total weight of the mixture) N,N-dimethyl-p-toluidine was added. The mixture was heated for about 24 hr. at 65°-70° C. The gel time at 82° C. was again checked and when it was about 25 min., 50 p.p.m. 1,4-naphthoquinone was added. The mixture was then cooled to room temperature.

Formulation IV-C was prepared by charging 75.0 parts of the reactive thickener designated II-G, MMA-/OA/MAN (37/60/3) and HPMA, 15.53 parts HEMA, 0.01 part Na₄ EDTA, 0.005 part oxalic acid, and 2.0 parts saccharin to a polyethylene crock fitted with a stirrer. The mixture was heated to 65°-70° C. over a period of 45 min. A total of 0.75 part N,N-dimethyl-p-toluidine was added in two equal portions with an interval of 1 hr. between additions. Mixing was continued at 65°-70° C. for 2 hr., 6.0 parts methacrylic acid were

TABLE II

| | | Anaerobic Adhesive | | | |
|---|---|---|---|---|---|
| Composition | | | | | |
| | | Methacrylate Monomer | | Evaluation | |
| Thickener | | HEMA* | IBOMA** | Tensile Shear Strength | Impact Strength |
| (Designation) | (wt. %) | (wt. %) | (wt. %) | (p.s.i.) | (ft - lb./in.) |
| (Reactive) | | | | | |
| I-A | 52.66 | 26.72 | 10.00 | 2630 | 4.1 |
| I-A | 55.02 | 34.36 | — | 3070 | 5.7 |
| II-A3 | 52.66 | 36.72 | — | 2700 | 4.3 |
| II-C | 80.00 | 10.44 | — | 2500 | 6.2 |
| II-D1 | 52.66 | 36.72 | — | 1976 | 4.3 |
| II-E1 | 55.00 | 33.79 | — | — | 6.8 |
| II-E1 | 40.20 | 50.50 | — | 3632 | 8.3 |
| II-E2 | 50.00 | 40.43 | — | 3990 | — |
| II-E2 | 58.33 | 32.11 | — | 3600 | 6.5 |
| II-E3 | 40.20 | 50.50 | — | 3560 | 5.4 |
| II-E4 | 40.00 | 50.43 | — | 3600 | 8.1 |
| (Non-Reactive) | | | | | |
| Control*** | 52.66 | 26.72 | 10.00 | 1160 | 2.2 |

*Hydroxyethyl methacrylate
**Isobornyl methacrylate
***Ethyl acrylate polymer

Formulation IV-A was prepared by charging 57.4 parts of the reactive thickener designated II-E3, EA/BA/MAN (76.5/20/3.5) and HEMA, 33.8 parts hydroxyethyl methacrylate (HEMA), 0.01 part tetrasodium salt of ethylenediamine tetramine (Na₄ EDTA), and 2.5 parts N-mesyl-p-toluene sulfonamide to a polyethylene crock fitted with a stirrer. The mixture was heated to 65°-70° C. over a 45 min. period with stirring. A total of 0.55 part N,N-dimethyl-p-toludine was added in two equal portions with a 1 hr. interval between additions. The mixture was stirred for about 16 hr. at 65°-70° C. The active oxygen content and gel time were determined. When the active oxygen content was over 200 p.p.m. and the gel time was over 40 min., the mixture added, and the mixture was stirred for 1 hr. Then 0.5 part 2-methoxy-1,4-naphthoquinone was added, and stirring was continued for about 30 min. The mixture was cooled to room temperature, 0.5 part cumene hydroperoxide was added, and the mixture was maintained at room temperature overnight with stirring. The gel time was determined and when it reached 60-70 min. at 82° C., stirring was discontinued.

Formulation IV-D was prepared in the same manner as IV-C using 75.2 parts of the reactive thickener designated II-B, EA/CAN (75/25) and HEMA, 15.5 parts HEMA, 0.05 part oxalic acid, 0.005 part 2-methoxy-1,4-naphthoquinone, and the same amounts of Na₄ EDTA, saccharin, N,N-diemthyl-p-toluidine, methacrylic acid, and cumene hydroperoxide.

The formulations were evaluated as adhesives. The results are given in Table III. The testing methods previously described were used.

Summarizing, this invention is seen to provide novel anaerobic adhesives containing a novel reactive thickener which comprises a polymerizable polymeric adduct having pendant double bonds dissolved in a reactive monomeric diluent. It also provides a process for preparing the reactive thickener.

Now that the preferred embodiments of the present invention have been described in detail, various modifications and improvements thereon will become readily apparent to those skilled in the art.

TABLE III

| Formulation | Viscosity (cps. at 25° C.) | Impact Strength (ft. - lb./in.$^2$) | Pin & Collar Shear Strength (p.s.i.) | Torque (cure time) Break (in. - lb.) | Torque (cure time) Prevailing (in. - lb.) | Tensile Shear Strength (p.s.i.) |
|---|---|---|---|---|---|---|
| IV-A | 8,200 | 2.9 | 1743 | — | — | — |
| IV-B | 13,800 | — | 2460 | 192 (24 hr.) | 235 (24 hr.) | — |
| IV-C | 8,600 | 5.2* | 2050* | 133 (90 min.) 258 (24 hr.) | 175 (90 min.) 175 (24 hr.) | — |
| IV-D | — | — | — | — | — | 2550 |

*24 hr. cure

Accordingly the spirit and scope of the invention are to be limited only by the appended claims and not by the foregoing specifications.

What is claimed is:

1. An anaerobic composition, comprising:
   (A) about 5-95% by weight of a polymerizable, anaerobically curable $C_2$-$C_5$ hydroxyalkyl acrylate or methacrylate monomer;
   (B) about 5-95% by weight of a polymerizable polymeric adduct having pendant double bonds as a reactive thickener; the adduct being the additive reaction product of the $C_2$-$C_5$ hydroxyalkyl acrylate or methacrylate monomer of (A) and an anhydride-containing polymer derived from about 0.5-50 mole % maleic, citraconic, or itaconic anhydride and about 50-99.5 mole % of a monomer having the formula $CH_2=C(R^1)X$, wherein $R^1$ is H, $CH_3$ or CN, X is a phenyl or COOR group, and R is a halogen substituted or unsubstituted $C_1$-$C_{10}$ alkyl group or a halogen, alkoxy, or ester substituted or unsubstituted $C_7$-$C_{20}$ aralkyl group, the adduct being free of unreacted anhydride groups;
   (C) 0-15% by weight of a carboxyl-containing monomer; and
   (D) a free radical inhibitor in sufficient concentration to initiate cure upon the exclusion of oxygen.

2. The composition of claim 1, further comprising an additive for free radical polymerization selected from the group consisting of a stabilizer, an accelerator, a chelator, and mixtures thereof.

3. The composition of claim 1, wherein (A) is about 25-50% of hydroxyethyl methacrylate and (B) is about 50-75% of the reaction product of hydroxyethyl methacrylate and the polymer derived from about 75-98.5% of a $C_1$-$C_8$ alkyl acrylate or methacrylate or styrene and about 1.5-25% maleic or citraconic anhydride.

4. The composition of claim 3, wherein (B) is the reaction product of hydroxyethyl methacrylate and the polymer of ethyl acrylate/maleic anhydride (95-98.5/1.5-5%), ethyl acrylate/citraconic anhydride (98.5/1.5%), ethyl methacrylate/maleic anhydride (96.5/3.5%), ethyl acrylate/methyl methacrylate/maleic anhydride (86.5-91.5/5-10/3.5%), ethyl acrylate/butyl acrylate/maleic anhydride (56.5-86.5/10-40/3.5%), butyl acrylate/styrene/maleic anhydride (82/15/3%), or styrene/maleic anhydride (75/25%).

5. The composition of claim 4, wherein (C) is acrylic or methacrylic acid present in an amount of 0.5-10%.

6. The composition of claim 1, wherein (A) is about 25-50% of hydroxypropyl methacrylate and (B) is about 50-75% of the reaction product of hydroxypropyl methacrylate and the polymer derived from about 75-98.5% of a $C_1$-$C_8$ alkyl acrylate or methacrylate or styrene and about 1.5-25% maleic or citraconic anhydride.

7. The composition of claim 5, wherein (B) is the reaction product of hydroxypropyl methacrylate and the polymer of methyl methacrylate/octyl acrylate/maleic anhydride (37/60/3%).

8. The composition of claim 7, wherein (C) is acrylic acid or methacrylic acid present in an amount of 0.5-10%.

9. The composition of claim 1, wherein the anaerobically curable monomer of (A) further comprises a monomer selected from the group consisting of
   (a) monofunctional acrylate and methacrylate esters or derivatives of the esters being selected from the group consisting of amide, cyano, chloro, and silane and
   (b) polyfunctional acrylate and methacrylate esters having the formula

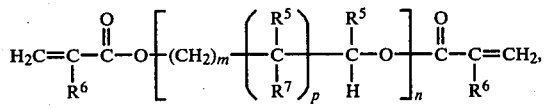

wherein $R^5$ is H, $CH_3$, $C_2H_5$, or $CH_2OC(=O)C(R^6)=CH_2$; $R^6$ is H, Cl, $CH_3$, or $C_2H_5$; $R^7$ is H, OH, or $O=C(=O)C(R^6)=CH_2$; m is an integer from 1 to 8; n is an integer from 1 to 20; and p is 0 or 1.

10. The composition of claim 9, wherein the monofunctional ester is isobornyl methacrylate and the polyfunctional ester is tetraethylene glycol dimethacrylate.

11. The composition of claim 1, wherein (A) is a mixture of about 27% hydroxyethyl methacrylate and 10% isobornyl methacrylate and (B) is the reaction product of ethyl acrylate/maleic anhydride polymer (98.5/1.5%) and wherein (A) is a mixture of 20% hydroxyethyl methacrylate and 17% tetraethylene glycol dimethacrylate and (B) is the reaction product of hydroxyethyl methacrylate and styrene/maleic anhydride polymer (75/25%).

12. The anaerobic composition of claim 1, prepared by:

(a) polymerizing, in the presence of a solvent and a free radical initiator, the anhydride and the monomer having the formula $CH_2=C(R^1)X$;

(b) stripping off any unreacted monomer and solvent from the anhydride-containing polymer;

(c) reacting the stripped polymer with the $C_2-C_5$-hydroxyalkyl acrylate or methacrylate monomer to form the adduct, the hydroxyalkyl (meth)acrylate monomer being used in an excess of the number of moles required to react by addition with the anhydride groups of the polymer, the excess dissolving the adduct and serving as the anaerobically curable monomer of (A); and (d) adding a free radical initiator in sufficient concentration to initiate cure upon the exclusion of oxygen.

13. A process for improving an anaerobic composition based on a polymerizable anaerobically curable $C_2-C_5$ hydroxyalkyl acrylate or methacrylate monomer, and a free radical initiator, which comprises the step of adding thereto from about 5-95% by weight of a reactive thickener, based on the total composition weight; the reactive thickener comprising at least one polymerizable polymeric adduct having pendant double bonds; the adduct being the addition reaction product of a $C_2-C_5$ hydroxyalkyl acrylate or methacrylate monomer and an anhydride-containing polymer derived from about 0.5-50 mole % maleic, citraconic, or itaconic anhydride and about 50-99.5 mole % of a monomer having the formula $CH_2=C(R^1)X$, wherein $R^1$ is H, $CH_2$ or CN, X is a phenyl or COOR group, and R is a halogen substituted or unsubstituted $C_1-C_{10}$ alkyl group or a halogen, alkoxy, or ester substituted or unsubstituted $C_7-C_{20}$ aralkyl group.

* * * * *